(12) United States Patent
Berger et al.

(10) Patent No.: US 12,371,144 B2
(45) Date of Patent: Jul. 29, 2025

(54) AIRCRAFT CANOPY WITH DISTINCTLY SHAPED FIRST AND SECOND CANOPY PORTION EDGES AND AN INTERCONNECT STRUCTURE SECURING FIRST AND SECOND PORTIONS IN AN ASSEMBLED RELATIONSHIP

(71) Applicant: Northrop Grumman Systems Corporation, Falls Church, VA (US)

(72) Inventors: Thaddeus Steven Berger, Redondo Beach, CA (US); Thomas C. Yeh, Redondo Beach, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 0 days.

(21) Appl. No.: 18/103,025

(22) Filed: Jan. 30, 2023

(65) Prior Publication Data

US 2024/0253762 A1 Aug. 1, 2024

(51) Int. Cl.
*B64C 1/14* (2006.01)
(52) U.S. Cl.
CPC .................. *B64C 1/1476* (2013.01)
(58) Field of Classification Search
CPC ........ B64C 1/1476; B64C 1/1492; B64C 1/32
See application file for complete search history.

(56) References Cited

U.S. PATENT DOCUMENTS

| 2,637,076 | A | | 5/1953 | Bolte |
| 2,652,996 | A | | 9/1953 | Yujuico et al. |
| 2,731,220 | A | | 1/1956 | Power |
| 2,828,094 | A | | 3/1958 | Hildebrand |
| 3,259,345 | A | * | 7/1966 | Martignoni ........... B64C 1/1476 52/201 |
| 4,375,281 | A | | 3/1983 | Nichols |
| 5,085,383 | A | * | 2/1992 | Larkin .................. B64C 1/1476 52/584.1 |
| 5,289,996 | A | | 3/1994 | Speelman, III |
| 6,848,655 | B2 | | 2/2005 | Wood |

FOREIGN PATENT DOCUMENTS

FR 1537215 A 8/1968
GB 2217669 A 11/1989

OTHER PUBLICATIONS

International Search Report and Written Opinion for PCT/US2023/033589 mailed Jan. 3, 2024 dated, 13 pages.

\* cited by examiner

*Primary Examiner* — Joshua D Huson
*Assistant Examiner* — Shanna Danielle Glover
(74) *Attorney, Agent, or Firm* — KLINTWORTH & ROZENBLAT LLP

(57) ABSTRACT

An aircraft canopy comprises first and second canopy portions, wherein the first canopy portion includes a leading edge having a chevron shape and wherein the second canopy portion has a trailing edge complementary to the shape of the leading edge. An interconnect structure is disposed between the leading edge and the trailing edge and maintains the first and second canopy portions in assembled relationship.

12 Claims, 5 Drawing Sheets

AIRCRAFT CANOPY WITH DISTINCTLY SHAPED FIRST AND SECOND CANOPY PORTION EDGES AND AN INTERCONNECT STRUCTURE SECURING FIRST AND SECOND PORTIONS IN AN ASSEMBLED RELATIONSHIP

FIELD OF DISCLOSURE

The present subject matter relates to aircraft enclosures, and more particularly, to an aircraft canopy having reduced lifecycle cost.

BACKGROUND

An aircraft canopy must balance competing design considerations, such as pilot visibility, strength, lifecycle cost, ejection requirements, ability to accept low observability treatments, etc. Traditional canopy designs have been of the multipiece (e.g., two-piece) or single-piece types. Currently available two-piece canopies for example, as used on older 4th generation platforms, include a canopy bow that is defined by a forward-facing planar arc, and are often tilted forward, both of which degrade signature performance but are effective for structural performance and mechanisms when used in the typical two-piece configuration with an actuated canopy with a fixed windscreen. Such a design has a relatively low lifecycle cost inasmuch as only a portion of the canopy (i.e., the windscreen) need be replaced when structural integrity of the canopy is compromised, such as may occur as a result of a bird strike.

The configuration typically seen on 5th generation platforms comprises a single-piece canopy. While pilot visibility is enhanced, major increases in lifecycle cost are incurred due to the need to replace the entire canopy when canopy integrity is compromised.

Accordingly, higher canopy maintenance and more frequent replacements as a result of using the single-piece design can result in major cost impacts, but the 4th generation two-piece canopy designs cannot meet the performance needs of next generation platforms. Next generation designs will need to balance cost and performance.

U.S. Pat. No. 2,652,996 discloses an aircraft canopy and uses a station-aligned structural bow. U.S. Pat. No. 2,731,220 discloses a canopy seal and also discloses a planar-curved, vertical canopy bow. U.S. Pat. No. 2,637,076 addresses the structural strength of a canopy in a pressurized cockpit with an integral reinforced plastic material added to the canopy to increase strength. The surrounding metal structure and its impacts on vehicle performance are not considered. U.S. Pat. No. 4,375,281 discloses a locking mechanism for a canopy. U.S. Pat. No. 2,828,094 discloses a mechanism for aircraft canopies. U.S. Pat. No. 2,828,094 discloses a typical 4th generation aircraft canopy design. U.S. Pat. No. 6,848,655 discloses a 5th generation canopy system.

SUMMARY

According to one aspect, an aircraft canopy comprises first and second canopy portions, wherein the first canopy portion includes a leading edge having a chevron shape comprising an apex portion and wherein the second canopy portion has a trailing edge having first and second groove portions. An interconnect structure is disposed between the leading edge and the trailing edge and maintains the first and second canopy portions in assembled relationship with the apex portion of the leading-edge inter-fitting between the first and second groove portions of the trailing edge.

According to another aspect, an aircraft canopy comprises first and second canopy portions, wherein the first canopy portion includes a leading edge having a chevron shape and has a first thickness and three V-shaped apex portions separated by four V-shaped groove portions, and wherein the second canopy portion has a trailing edge and a second thickness greater than the first thickness and four V-shaped apex portions separated by three V-shaped groove portions. An interconnect structure is disposed between the leading edge and the trailing edge and maintaining the first and second canopy portions in assembled relationship, wherein the interconnect structure includes planform aligned surfaces and wherein each of the three V-shaped apex portions of the leading edge is disposed in one of the three V-shaped groove portions of the trailing edge and each of the four V-shaped apex portions of the trailing edge is disposed in one of the V-shaped groove portions of the leading edge.

Other aspects and advantages will become apparent upon consideration of the following detailed description and the attached drawings wherein like numerals designate like structures throughout the specification.

BRIEF DESCRIPTION OF THE DRAWINGS

FIGS. 4-6 are isometric, plan, and side elevational views, respectively, of a first, aft portion of the canopy of FIGS. 1-3 wherein FIG. 5 is taken generally along the view lines 5-5 of FIG. 6.

DETAILED DESCRIPTION

Referring to the FIGS., an aircraft canopy 20 comprises first (or aft) and second (or forward) separate canopy portions 22, 24, respectively, of one or more transparent materials, such as glass, polycarbonate, acrylic, or the like, for greater durability and lower lifecycle cost. In an embodiment, the portions 22, 24 are made from the same material, although this need not be the case inasmuch as the portions 22, 24 may be made of different materials. Also, in an embodiment, the second portion 24 has a damage resistance that exceeds the damage resistance of the first portion 22. This may be accomplished by forming the second portion 24 with a thicker, more durable cross-section as compared to the portion 22. Alternatively or in addition, the portion 24 made be made of a more damage resistant material than the portion 22. In this fashion, the second portion 24 is to better able to withstand bird strikes and other damage-inducing effects. The first portion 22, on the other hand, can be made less costly given the reduced requirement for damage resistance.

Figure 4:
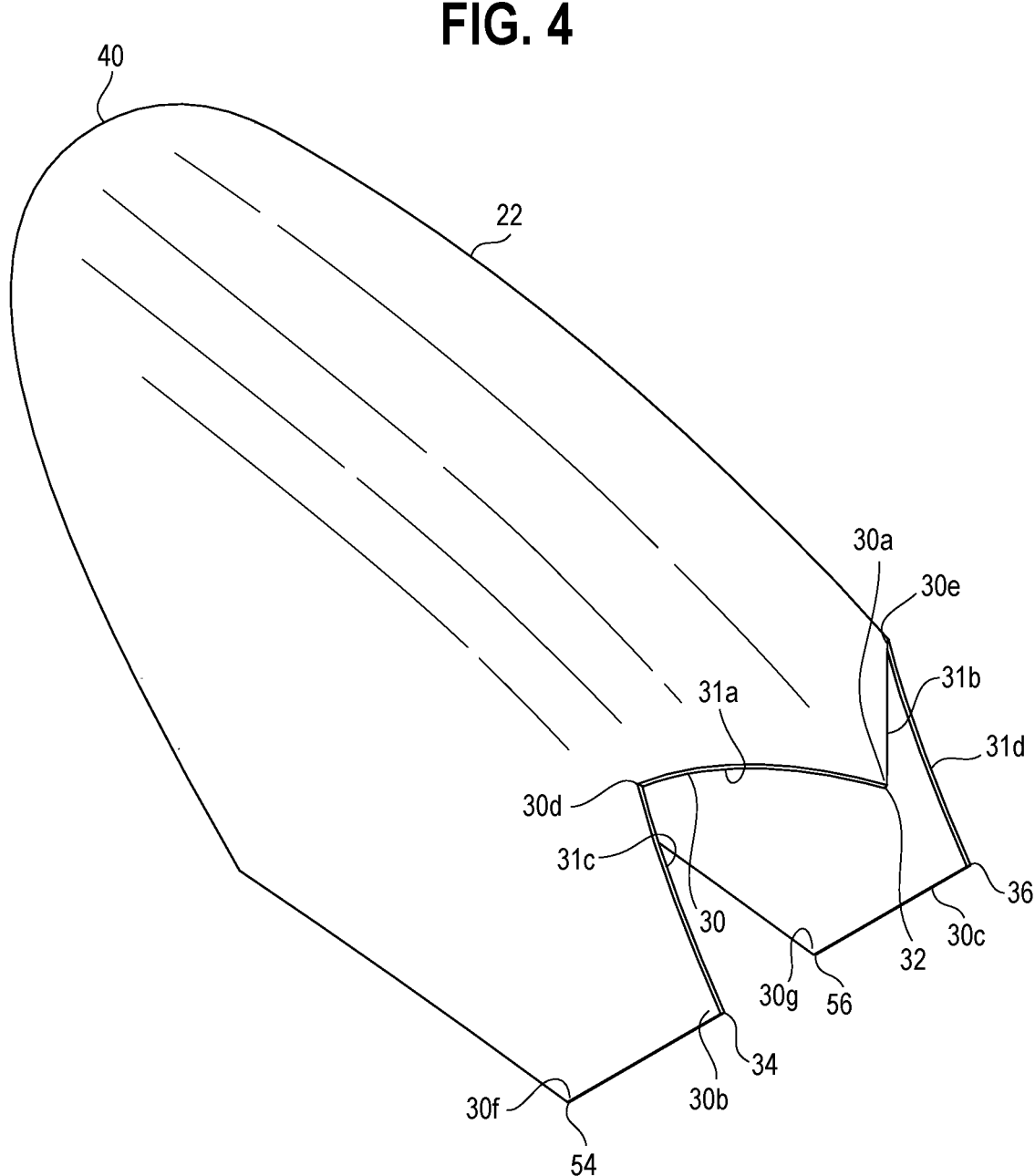
Figure 5:
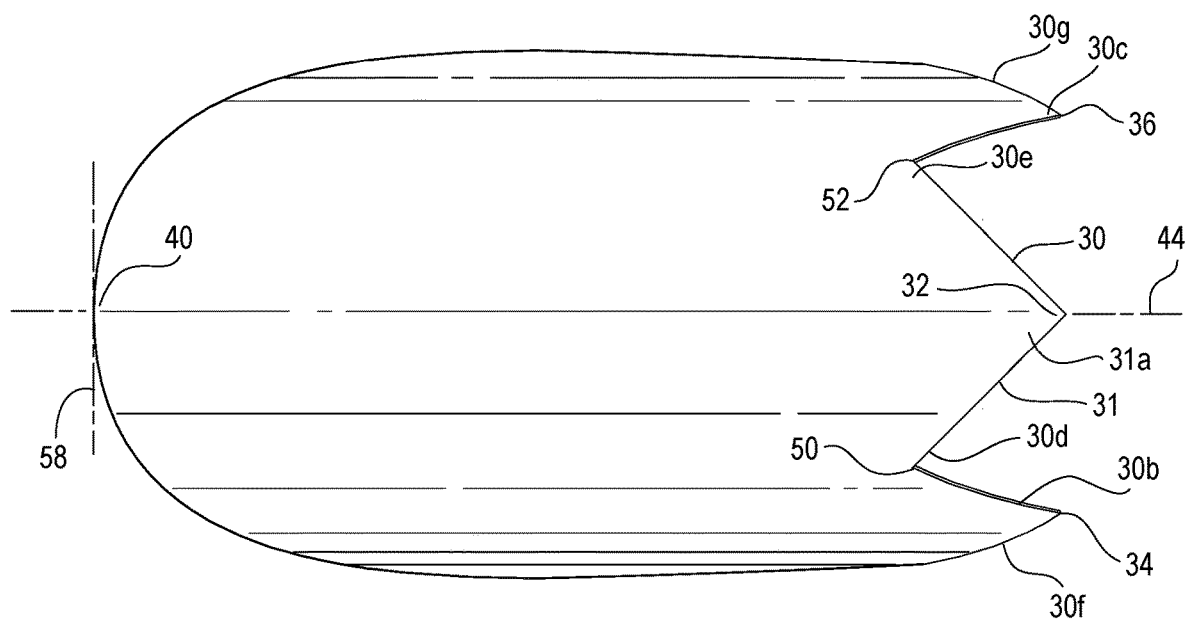
Figure 6:
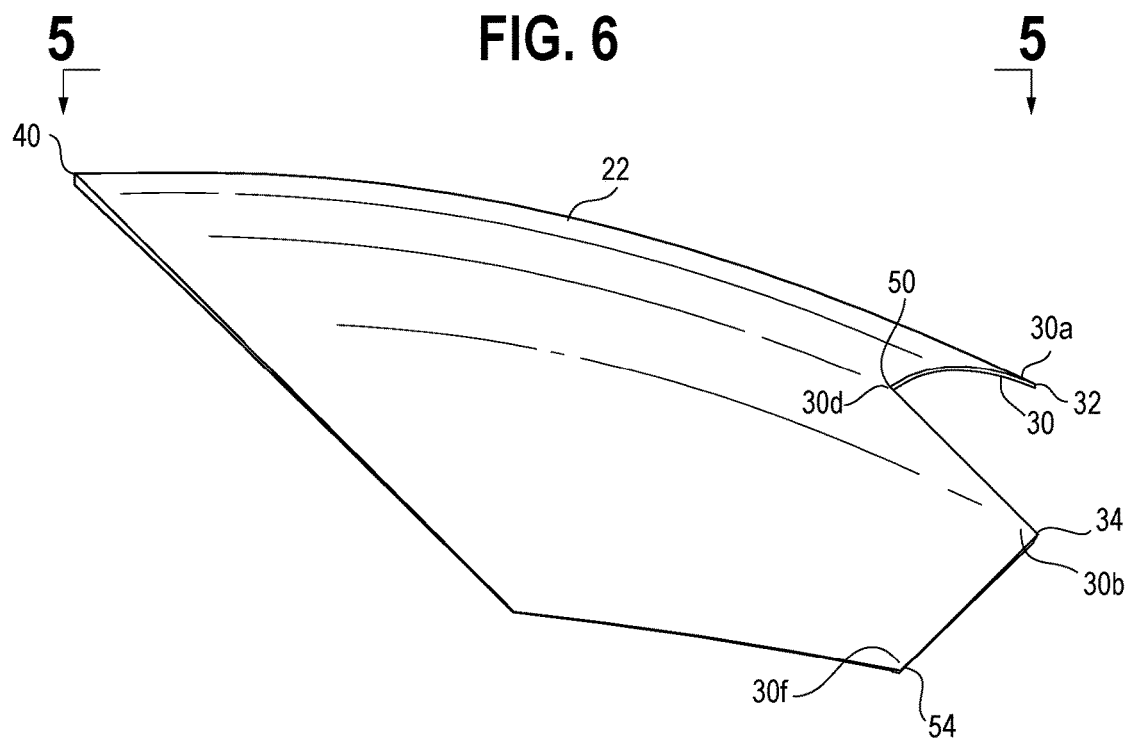
Figure 7:
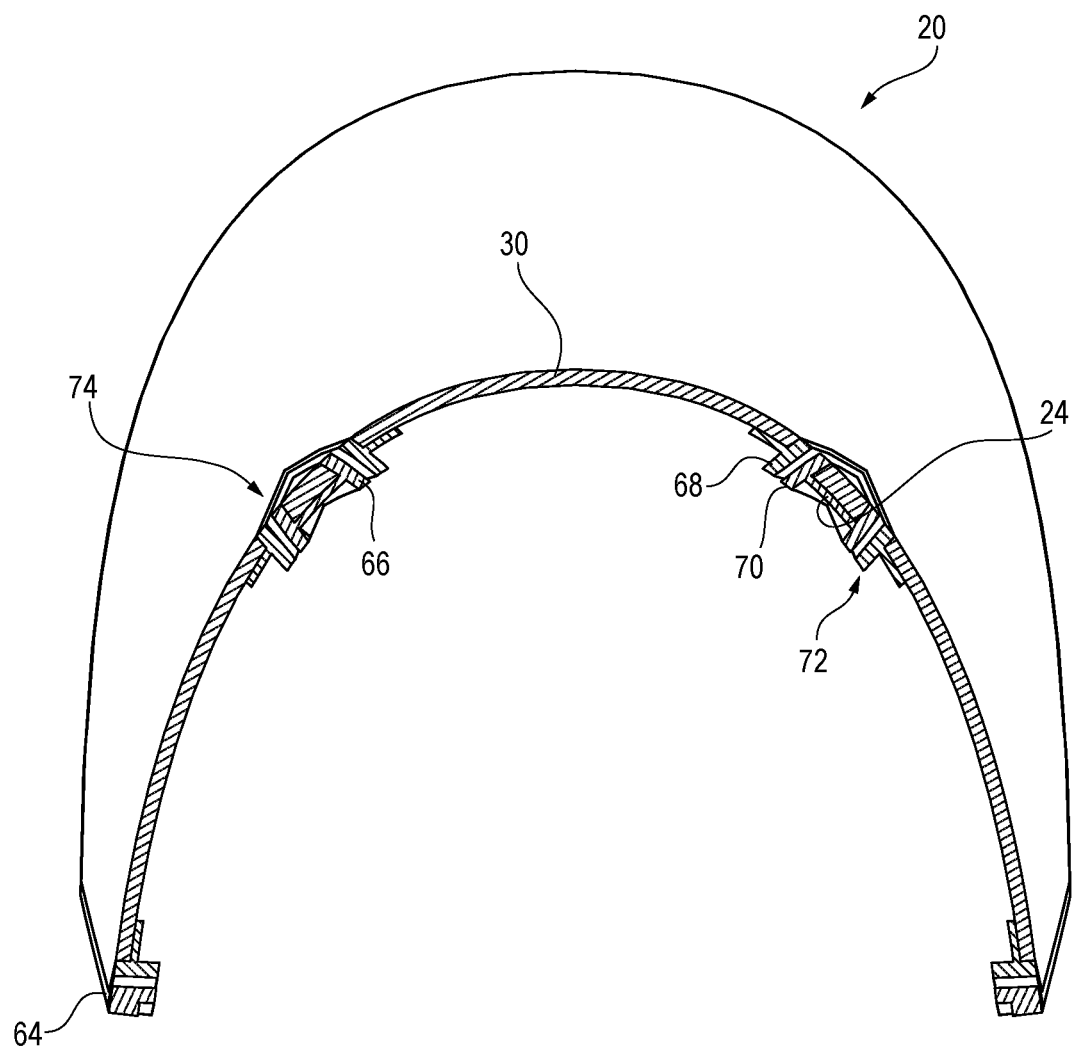
FIG. 7 is a sectional view taken generally along the lines 7-7 of FIG. 3.

Referring to FIGS. 4-6, the first portion 22 includes a leading edge 30 that can be described as having a W shape or a chevron shape and includes three apex portions 30a, 30b, and 30c separated by four V-shaped groove portions 30d, 30e, 30f, and 30g. In the illustrated embodiment, the apex portions 30a-30c and the groove portions 30d-30g are defined by substantially straight lines when each such line is viewed normal to the surface of the portion 22 at such line.

Thus, for example, an edge surface 31a between the apex portion 30a and the groove portion 30d is substantially linear as seen in the plan view of FIG. 5. (Conversely, the surface 31a appears curved in FIG. 4 due to the overall curvature of the portion 22, but is, in fact linear when viewed normal to the surface of the portion 22 at such surface 31a.)

A front tip 32 of the apex portion 30a extends forward farther as seen in the plan view of FIG. 5 than front tips 34, 36 of the apex portions 30a and 30c, respectively. Such an appearance is a result of the portion 22 being shown in an "as installed" state on an aircraft in which a rear tip 40 of the portion 22 is disposed at an elevation higher (as seen in FIG. 6) than the groove portions 30f and 30g. In fact, the edge surface 31a, and other edge surfaces 31b-31d in part defining the leading edge 30 of the portion 22 are of substantially equal lengths relative to one another. Edge surfaces 31e and 31f are of substantially equal lengths relative to one another and each surface 31e, 31f is shorter than each of the edge surfaces 31a-31d. The front tips 34 and 36 are disposed at equal distances from a rear tip 40 of the canopy 20, again as seen in the plan view of FIG. 5.

Included angles defining the tips 32, 34, and 36 are substantially equal to one another and the tip 32 is equally spaced from the tips 34 and 36 in a lateral direction perpendicular to a canopy centerline 44 (seen in FIG. 5). In addition, the tip 32 is centered on the canopy centerline 44.

Still further in the illustrated embodiment, and, in particular, views FIGS. 4 and 5, base portions 50, 52, 54, 56 at the aft ends of the V-shaped groove portions 30d, 30e, 30f, and 30g, respectively, are disposed at locations substantially equidistant from a line 58 perpendicular to the centerline 44 and coincident with the rear tip 40 of the canopy 20. The base portions 50, 52, 54, and 56 are equally laterally spaced from one another.

From the foregoing, it can be seen that the W-shape or chevon shape is substantially symmetric about the centerline 44.

Figure 1:
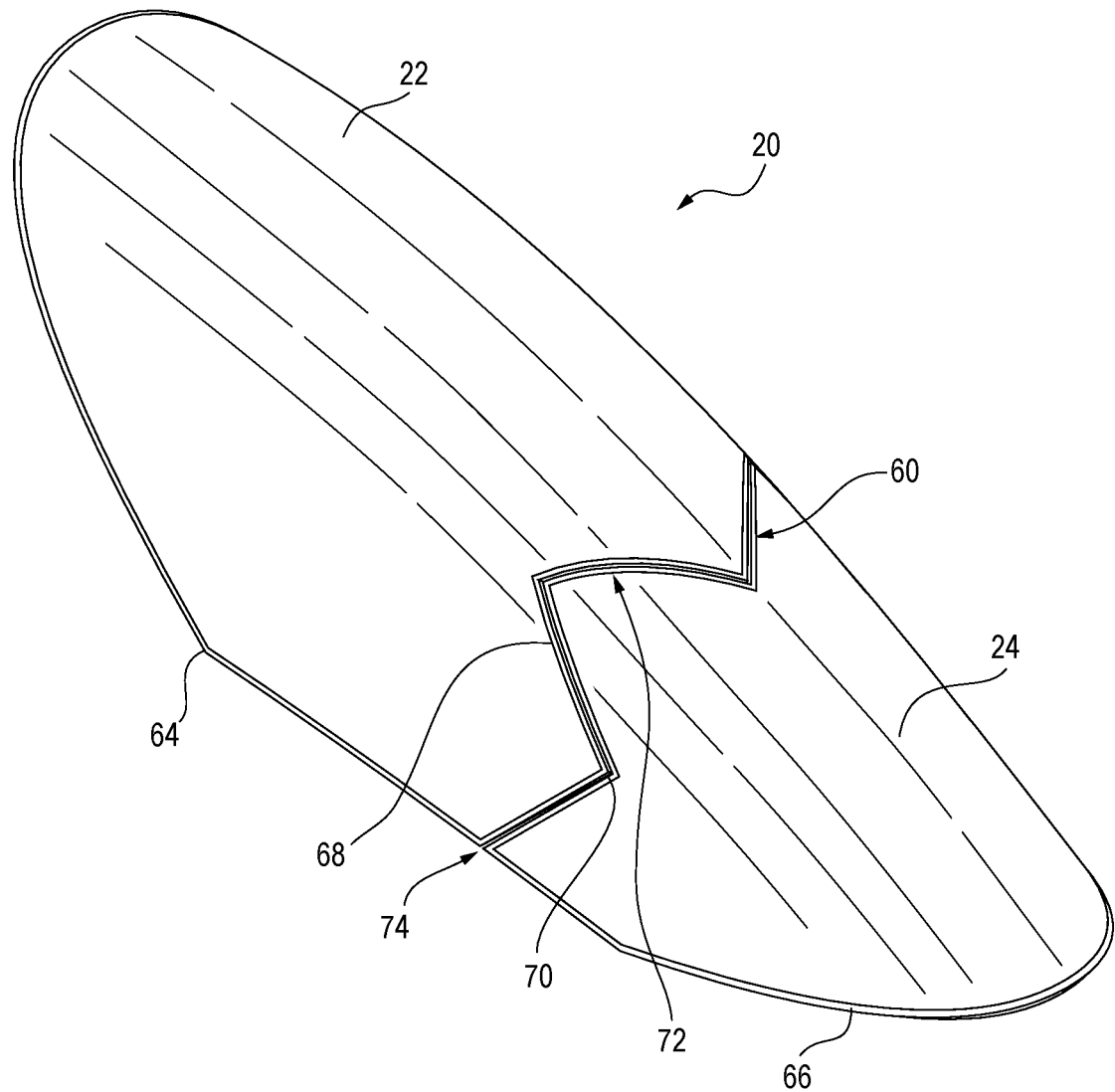
FIG. 1 is an isometric view of a multi-piece aircraft canopy.
Figure 2:
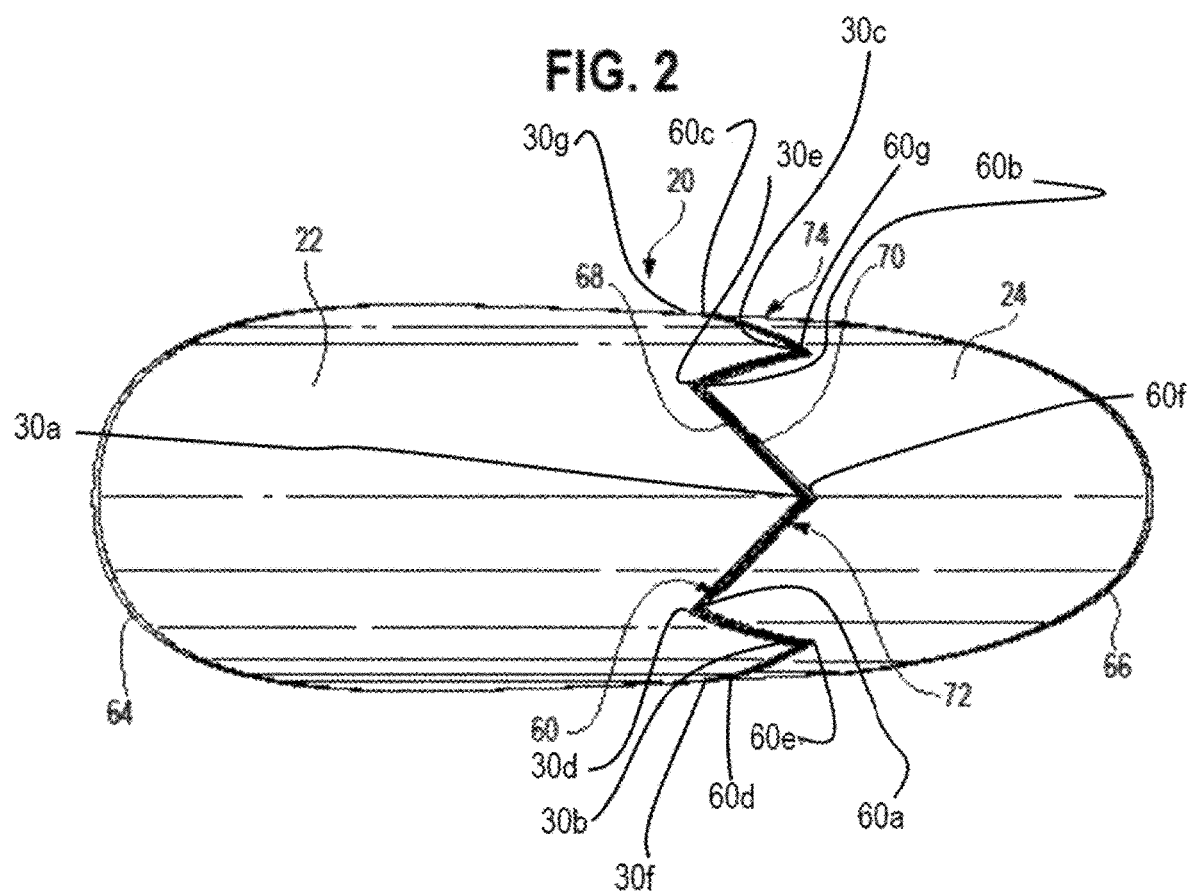
FIG. 2 is a plan view of the aircraft canopy of FIG. 1.
Figure 3:
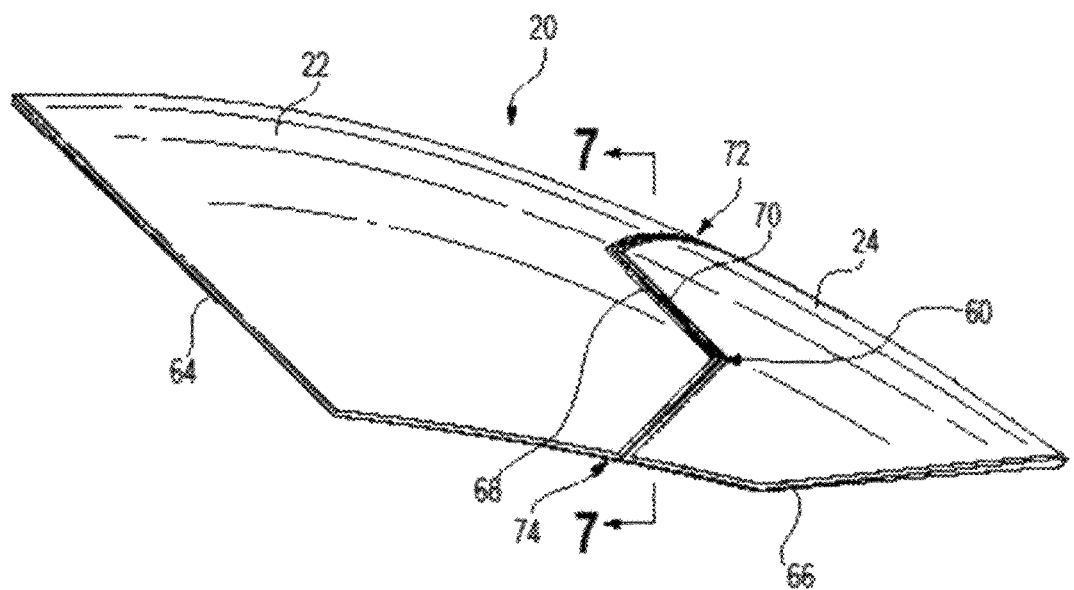
FIG. 3 is a side elevational view of the aircraft canopy of FIG. 1.

Referring also to FIGS. 1-3 and 7, the second portion 24 has a trailing edge 60 that is preferably complementary to the shape of the leading edge 30. Thus, as seen in FIG. 2, the trailing edge 60 includes four apex portions 60a, 60b, 60c, and 60d separated by three V-shaped groove portions 60e, 60f, 60g. In the illustrated embodiment, the first and second portions 22, 24 are disposed in frames 64, 66, respectively, and each of the frames 64, 66 includes portions 68, 70, respectively, that are secured to one another in any suitable manner, such as by fasteners, to form an interconnect structure 72 at a canopy bow (i.e., middle) portion 74. The interconnect structure 72 is thus disposed between the leading edge 30 and the trailing edge 60 and secures the portions 22, 24 together as a unit with each apex portions of the leading edge 30, such as the apex portion 30a, extending into one of the groove portions of the trailing edge 60, such as the groove portion 60f, and inter-fitting between two of the apex portions of the trailing edge 60, such as the apex portions 60a and 60b. Similarly, the apex portions 30b, 30c of the leading edge 30 extend into the groove portions 60e, 60g, respectively, of the trailing edge 60. Further, the apex portion 30b inter-fits between the apex portions 60a, 60d and the apex portion 30c inter-fits between the apex portions 60b and 60c. The frames 64, 66 including the interconnect structure 72 may be fabricated of one or more lightweight structural and sealing materials, such as metal, (e.g., aluminum and/or titanium) and rubber and/or silicone and/or acrylic sealants. The frames 64, 66 may be L-shaped, T-shaped, U-shaped or any other suitable shape in cross section. The canopy portions 22, 24 may be secured to the frames 64, 66 by mechanical fasteners, clamping devices, sealants, or a combination thereof.

The surfaces of the interconnect structure 72 are preferably substantially linear to conform to the edge surfaces of the portions 22, 24 and planform aligned with other structures of the aircraft.

In an embodiment, the second portion 24 comprises a single-curved replaceable windshield that reduces lifecycle cost, allows application of calendared low observable (LO) treatments, and includes tailored LO internal structural support to meet next-generation signature, visibility, ejection, and mechanical requirements.

INDUSTRIAL APPLICABILITY

As should be evident, the illustrated canopy 20 incorporates elements of both 4th and 5th generation platforms' canopy designs to achieve a balance of high performance and high durability at a lower cost. In an embodiment, the canopy's bow section is chevroned and fits a thicker, more durable piece of transparent material in the front with a lighter piece in the back. The use of two portions of transparent material allows easier tailoring of the transparent material portions and the single-curved front windscreen enables easy application of calendared surface treatments. The chevroned bow mitigates performance impacts while the two portions of transparent material can be tailored to balance durability, optical performance, pilot ejection capability, structural performance, and easier application of calendared materials.

Planform aligning the canopy bow and tilting the bow backward mitigate negative performance impacts while meeting structural strength needs of the canopy bow and bringing the lifecycle cost of next generation canopies down. In the case of damage to the windshield, the second portion 24 can be removed and replaced, without the need to remove and replace the first portion 22.

While particular embodiments of the present invention have been illustrated and described, it would be apparent to those skilled in the art that various other changes and modifications can be made and are intended to fall within the spirit and scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure.

We claim:

1. An aircraft canopy, comprising:
   first and second canopy portions;
   wherein the first canopy portion includes a leading edge having a chevron shape comprising an apex portion;
   wherein the second canopy portion has a trailing edge having first and second groove portions; and
   an interconnect structure disposed between the leading edge and the trailing edge wherein the interconnect structure secures the first and second canopy portions in assembled relationship with the apex portion of the leading edge inter-fitting between the first and second groove portions of the trailing edge.

2. The aircraft canopy of claim 1, wherein the first and second canopy portions comprise identical materials.

3. The aircraft canopy of claim 1, wherein the first and second canopy portions comprise different materials.

4. The aircraft canopy of claim 1, wherein the first and second canopy portions have different thicknesses.

5. The aircraft canopy of claim 1, wherein the first and second canopy portions comprise at least one transparent material.

6. The aircraft canopy of claim 1, wherein the interconnect structure includes planform aligned surfaces.

7. The aircraft canopy of claim 1, wherein the leading edge includes apex portions separated by groove portions.

8. An aircraft canopy, comprising:
   first and second canopy portions;
   wherein the first canopy portion includes a leading edge having a chevron shape and has a first thickness and three V-shaped apex portions separated by four V-shaped groove portions;
   wherein the second canopy portion has a trailing edge and a second thickness greater than the first thickness and four V-shaped apex portions separated by three V-shaped groove portions; and
   an interconnect structure disposed between the leading edge and the trailing edge and maintaining the first and second canopy portions in assembled relationship, wherein the interconnect structure includes planform aligned surfaces and wherein each of the three V-shaped apex portions of the leading edge is disposed in one of the three V-shaped groove portions of the trailing edge and each of the four V-shaped apex portions of the trailing edge is disposed in one of the V-shaped groove portions of the leading edge.

9. The aircraft canopy of claim 8, wherein the first and second canopy portions comprise identical materials.

10. The aircraft canopy of claim 8, wherein the first and second canopy portions comprise different materials.

11. The aircraft canopy of claim 8, wherein the first and second canopy portions have different thicknesses.

12. The aircraft canopy of claim 8, wherein the first and second canopy portions comprise at least one transparent material.

* * * * *